United States Patent Office 2,874,177
Patented Feb. 17, 1959

2,874,177

NOVEL COMPLEX SALT OF 4-AMINOSALICYLIC ACID AND PROCESSES FOR PRODUCING THE SAME

Kyoji Hayano, Neyagawa City, Japan, assignor to Gohei Tanabe & Co., Ltd., Osaka, Japan, a corporation of Japan No Drawing. Application June 8, 1956
Serial No. 590,090

Claims priority, application Japan June 25, 1955

2 Claims. (Cl. 260—448)

This invention relates to a novel complex salt of 4-aminosalicylic acid and to novel processes for the preparation thereof.

4-aminosalicylic acid is known to be of great value in the treatment of tuberculosis in human beings. This compound has to be administered in large doses and often over a long period of time. When the free 4-aminosalicylic acid is administered in the large doses often required, excessive acidity has resulted in serious gastric disturbances in a number of patients. It has been suggested the sodium salt, which is readily obtainable, and which, like the free acid itself, is stable during storage, might be employed to overcome the excessive acidity of the free acid. However, the large doses of sodium salt required introduce excessive amounts of sodium into the body of the patient, thus upsetting the potassium balance and producing undesirable side-effects. The sodium salt is also unpalatable. The calcium salts of 4-aminosalicylic acid, both neutral and basic, are unstable under normal periods and conditions of storage and undesirable for oral administration because of their bitter taste.

It is an object of the present invention to overcome the disadvantages of 4-aminosalicylic acid and certain of its derivatives.

It is also an object of the present invention to provide a novel derivative of 4-aminosalicylic acid having desirable properties for oral administration in human therapy.

It is an additional object of the present invention to provide novel processes for producing calcium alumino-4-salicylic acid.

Other objects will be apparent to those skilled in the art from reading the specification which follows.

According to the present invention, it has been found that calcium alumino-4-aminosalicylate is free of the shortcomings referred to above of 4-aminosalicylic acid and its sodium and calcium salts. This novel complex salt of 4-aminosalicylic acid is stable over long periods of storage under normal conditions. It is of substantially the same therapeutic effectiveness as 4-aminosalicylic acid and its sodium and calcium salts for the treatment of tuberculosis. It may suitably be administered orally to the patient and provide prolonged blood levels of 4-aminosalicylic acid. It is difficultly soluble in water. This novel complex salt is substantially tasteless and is more palatable than the known salts of 4-aminosalicylic acid. It may be administered in large doses without causing gastro-intestinal disturbances or other undesirable side-effects. It is highly suitable for administration to children.

The calcium alumino-4-aminosalicylate of the present invention usually crystallizes from water with 3 to 5 molecules of water of crystallization and may be represented by the following structural formula:

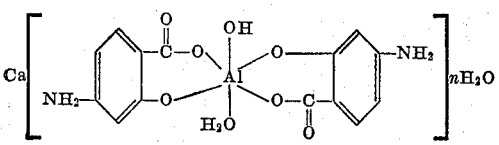

wherein "$n$" is an integer of between 3 and 5, inclusive, and the molecular ratio of calcium: 4-aminosalicylic acid: aluminum in this compound is 1:2:1.

The present invention also comprises novel processes for producing the calcium alumino-4-aminosalicylate. Generally speaking, the processes constitute the neutralization or a metathetical reaction of a member selected from the group consisting of free alumino-4-aminosalicylic acid, its ammonium and alkali-metal salts with a member selected from the class consisting of calcium hydroxide and water-soluble calcium salts, such as the chloride, bromide, nitrate, formate and acetate. More specifically, calcium alumino-4-aminosalicylate may be prepared by neutralizing an aqueous suspension of alumino-4-aminosalicylic acid with an aqueous suspension of an equivalent amount of calcium hydroxide, preferably at a temperature of 30°–40° C. An alternative process for preparing this compound involves a metathetical reaction of a member selected from the group consisting of ammonium salts and alkali-metal salts of alumino-4-aminosalicylic acid, upon a water-soluble calcium salt, such as the chloride, the bromide, the nitrate, the acetate or the formate.

Upon drying the salt, some of the crystallization water may effloresce, and the tetrahydrate is ordinarily obtained.

The ammonium salt and alkali-metal salts of alumino-4-aminosalicylic acid employed as starting materials can be prepared by neutralizing alumino-4-aminosalicylic acid in water with an equivalent amount of ammonium hydroxide or an alkali-metal hydroxide, preferably sodium hydroxide. For the metathetical reaction, ammonium alumino-4-aminosalicylate is the most advantageous.

Free alumino-4-aminosalicylic acid and its ammonium or alkali-metal salts employed as starting materials may be prepared by a similar process to that for preparing alumino-salicylic acid and its corresponding salts, described in the publication of Burrows and Wark in Journal of the Chemical Society (London), 1928, part I, pp. 222–229.

Preferably, alumino-4-aminosalicylic acid, which occurs as white powder hardly soluble in water, is prepared by a metathetical reaction employing 2 moles of the ammonium salt or an alkali-metal salt of 4-aminosalicylic acid upon 1 mole of a water-soluble aluminum salt, such as the chloride, the sulfate, or potassium or ammonium alum, in the presence of an alkali, such as sodium bicarbonate. The acid contains aluminum and 4-aminosalicylic acid in the molecular ratio of 1:2 and is combined with 2–3 moles of water of crystallization. The reaction may be typically illustrated by the following equation:

$2[NH_2C_6H_3(OH)\cdot COONa] + AlCl_3 + 2NaHCO_3 \longrightarrow$

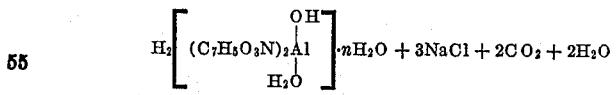

$+ nH_2O + 3NaCl + 2CO_2 + 2H_2O$ wherein "$n$" stands for 2 to 3.

In order more clearly to disclose the nature of the present invention, specific examples illustrating the practice of the invention will hereinafter be described. It should be understood, however, that this is done solely by way of example and is intended neither to delineate the scope of the invention nor limit the ambit of the appended claims. The term "part" employed in the examples shall be expressed in terms of weight.

*Example I*

About 118 parts of crystalline potassium alum dissolved in 500 parts of water were added to a solution of 105 parts of sodium 4-aminosalicylate and 10 parts of sodium bicarbonate dissolved in 500 parts of water. The mixture was warmed to a temperature of about 40° C.

and stirred for 3 hours. Whereupon, alumino-4-aminosalicylic acid precipitated. 85 parts of alumino-4-aminosalicylic acid trihydrate were obtained by filtering and drying the precipitate in vacuo.

A clear aqueous solution of sodium alumino-4-aminosalicylate was obtained by dissolving 42 parts of alumino-4-aminosalicylic acid trihydrate obtained above in a solution of 8 parts of sodium hydroxide and 185 parts of water. Added to this solution (pH 7.8–8.0) were 15 parts of calcium chloride dihydrate dissolved in 15 parts of water. The mixture then was stirred at 40° C. for 2 hours and cooled to room temperature. Then 50 parts of calcium alumino-4-aminosalicylate which precipitated were recovered by filtering, washing with water and drying in vacuo. This salt contains calcium and 4-aminosalicylic acid and aluminum in the molecular ratio of 1:2:1.

*Example II*

A suspension of calcium hydroxide freshly prepared from 14.7 parts of calcium chloride dihydrate and 8 parts of sodium hydroxide in 80 parts of water was added to a suspension of 42 parts of alumino-4-aminosalicylic acid trihydrate dispersed in 160 parts of water. The mixture was stirred at a temperature of 40° C. for 2 hours and cooled to room temperature. Then 40 parts of calcium alumino-4-aminosalicylate which precipitated were recovered by filtering, washing with water and drying in vacuo.

*Example III*

About 17 parts of alumino-4-aminosalicylic acid trihydrate were dissolved in 56 parts of 3.1% aqueous ammonium solution so as to form ammonium alumino-4-aminosalicylate. To the solution were added 7 parts of calcium chloride dihydrate dissolved in 7 parts of water. The mixture was stirred at a temperature of 40° C. for 2 hours and then cooled to room temperature. Then 17.8 parts of calcium alumino-4-aminosalicylate which precipitated were recovered by filtering, washing with water and drying in vacuo.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. Calcium alumino-4-aminosalicylate containing calcium and 4-aminosalicylic acid and aluminum in a molecular ratio of 1:2:1.

2. Calcium alumino-4-aminosalicylate containing calcium and 4-aminosalicylic acid and aluminum in a molecular ratio of 1:2:1 and having from 3 to 5 molecules of water of crystallization.

References Cited in the file of this patent

UNITED STATES PATENTS 2,686,800   Brown et al. _____ Aug. 17, 1954

OTHER REFERENCES

Burrows et al.: J. Chem. Soc. (London), 1928, pp. 222–229.